US007697849B2

(12) United States Patent
Kamio et al.

(10) Patent No.: US 7,697,849 B2
(45) Date of Patent: *Apr. 13, 2010

(54) METHOD AND APPARATUS FOR RECEIVING DATA

(75) Inventors: Yukiyoshi Kamio, Tokyo (JP); Tetsuya Miyazaki, Tokyo (JP)

(73) Assignee: National Institute of Information and Communications Technology Incorporated Administrative Agency, Koganei-shi (JP)

( * ) Notice: Subject to any disclaimer, the term of this patent is extended or adjusted under 35 U.S.C. 154(b) by 768 days.

This patent is subject to a terminal disclaimer.

(21) Appl. No.: 11/482,607

(22) Filed: Jul. 6, 2006

(65) Prior Publication Data

US 2007/0025737 A1 Feb. 1, 2007

(30) Foreign Application Priority Data

Jul. 6, 2005 (JP) ............................. 2005-196954

(51) Int. Cl.
*H04B 10/06* (2006.01)
(52) U.S. Cl. .................. 398/204; 398/161; 398/210
(58) Field of Classification Search ................ 398/150, 398/154, 155, 161, 32, 53, 102, 204, 210
See application file for complete search history.

(56) References Cited

U.S. PATENT DOCUMENTS 4,899,367 A 2/1990 Sampei

| 6,356,555 B1* | 3/2002 | Rakib et al. ............ 370/441 |
| 2003/0156603 A1* | 8/2003 | Rakib et al. ............ 370/485 |
| 2004/0213566 A1* | 10/2004 | Takanashi et al. ........... 398/32 |

FOREIGN PATENT DOCUMENTS

WO      WO 03/000008 A2     1/2003

OTHER PUBLICATIONS

European Search Report dated Oct. 4, 2006, for EP 06114129.7, in the name of National Institute of Information and Communications Technology Incorporated Administrative Agency.
K. Kikuchi, et al., "Degradation of Bit-Error Rate in Coherent Optical Communications Due to Spectral Spread of the Transmitter and the Local Oscillator," IEEE/USA Journal of Lightwave Technology, vol. LT-2, No. 6, pp. 1024-1033, Dec. 1984.

(Continued)

*Primary Examiner*—Dzung D Tran
(74) *Attorney, Agent, or Firm*—Christie, Parker & Hale, LLP

(57) ABSTRACT

An optical transmitter generates a transmission signal having a frame as a unit, the frame including a single optical pilot signal with a constant optical phase and a plurality of phase-modulated optical data signals, and outputs the transmission signal into a transmission line. In a receiver, a splitter splits the optical signal input from the transmission line. On a second arm of a Mach-Zehnder interferometer, an optical gate transmits the optical pilot signal and a duplicator duplicates the optical pilot signal output from the optical gate at predetermined time intervals. A balanced optical receiver converts the interfered optical signal output from the interferometer into an electrical signal. A gate and a discriminator extract the data from the electrical signal output from the receiver.

20 Claims, 4 Drawing Sheets

OTHER PUBLICATIONS

R. A. Griffin, et al., "10 Gb/s Optical Differential Quadrature Phase Shift Key (DQPSK) Transmission using GaAs/AlGaAs Integration," Proc of OFC 2002 Postdeadline Papers, FD6-1 to FD6-3, Mar. 2002.

B. Wandernoth, "1064 nm, 565 Mbit/s PSK Transmission Experiment With Homodyne Receiver Using Synchronisation Bits," Electronics Letters, vol. 27 No. 19, pp. 1692-1693, Sep. 12, 1991.

S. Tsukamoto, et al., "Coherent Demodulation of 40-Gbit/s Polarization-Multiplexed QPSK Signals with 16-GHz Spacing after 200-km Transmission," Proc of OFC 2005, PDP29, Mar. 2005.

T. Miyazaki, "PSK Self-Homodyne Detection Using a Pilot Carrier for Multibit/Symbol Transmission With Inverse-RZ Signal," IEEE Photonics Technology Letters, vol. 17, No. 6, pp. 1334-1336, Jun. 2005.

* cited by examiner

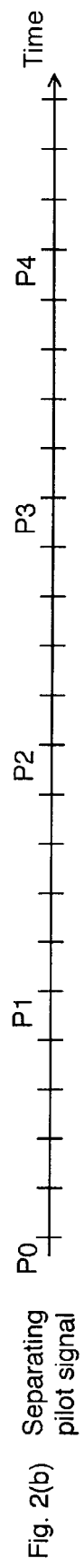
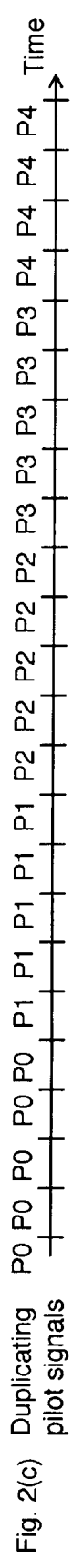
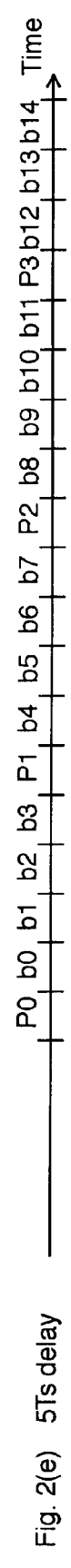
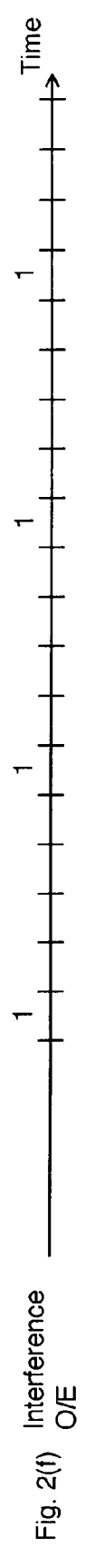

METHOD AND APPARATUS FOR RECEIVING DATA

CROSS REFERENCE TO RELATED APPLICATIONS

This application claims priority to Japanese Patent Application No. 2005-196954, filed on Jul. 6, 2005, the entire contents of which are incorporated herein by reference.

FIELD OF THE INVENTION

This invention relates to method and apparatus for receiving data.

BACKGROUND OF THE INVENTION

In the optical fiber transmission, it is inevitable to have the influence such as polarization mode dispersion and chromatic dispersion from an optical fiber transmission line so that the signal quality is deteriorated and the receiving sensitivity is decreased.

A number of receiving systems have been proposed according to the types of modulation systems. For instance, a heterodyne detection system based on a reference carrier is described in "Degradation of Bit-Error Rate in Coherent Optical Communications Due to Spectral Spread of the Transmitter and the Local Oscillator," IEEE/USA J. Lightwave Technol., Vol. LT-2, pp. 1024-1033, Dec. 1984 by K. Kikuchi, T. Okoshi, M. Nagamatsu, and N. Henmi. This system, similar to the present wireless communication, regenerates a carrier from a received signal to stabilize its frequency using an optical PLL (phase locked loop). This system does not require differential encoding process and it is possible to realize a transmission capacity and a receiving sensitivity level near to the theoretical limits. However, it is necessary to control a polarization of the reference carrier or received signal such that they are parallel with each other. In addition, it is difficult to realize an optical PLL. Moreover, it is required to suppress the influence of a phase noise of the reference carrier.

A delayed detection system for a DQPSK (Differential Quadrature Phase Shift Keying) signal is described in "10 Gb/s Optical Differential Quadrature Phase Shift Key (DQPSK) transmission Using GaAs/AlGaAs Integration," Proc of OFC2002, FD6, March 2002 by R. A. Griffin, R. I. Johnston, R. G. Walker, J. Hall, S. D. Wadsworth, K. Berry, A. C. Carter, M. J. Wale, J. Hughes, P. A. Jerram, and N. J. Parsons. The DQPSK transmission is a system to carry information using phase differentials between bits. A DQPSK signal is easily converted into an ASK (Amplitude Shift Keying) signal using interference between bits and then a data is demodulated from the ASK signal by an existing demodulator. This delayed detection system detects a signal by regarding one-bit prior signal as a local oscillating light. Since there is no need to regenerate a carrier, this system is practical and easy to be realized. However, in multi-level modulation, a transmitting side requires a complicated precoding. Also, it is not easy to comply with a change of a modulation method.

Another system is also well known in which a carrier signal is superimposed in a band of a modulated signal as a pilot carrier and a regenerated carrier is extracted through a filter. In this system, a carrier is separated and extracted by a filter and therefore a complicated filter control system is required to realize a stable receiving performance.

In a wireless communication system, a system to perform quasi-synchronous detection using a pilot symbol is well known as a kind of fading compensation system (see U.S. Pat. No. 4,899,367). In this system, a local reference signal generator in a receiving station performs quasi-detection and then the result is compensated by a pilot symbol. When this system is applied to optical transmission, it is necessary to make polarizations of a reference carrier and a received signal parallel with each other.

There is a transmission system to perform self-heterodyne detection by transmitting a pilot carrier in a frequency band other than the frequency band for data transmission. However, the pilot carrier needs to be sufficiently apart from the frequency band for data transmission and therefore the usability of the frequencies becomes inefficient.

A system to use a pilot signal and a regenerated clock signal is described by B. Wandernoth in "1064 nm, 565 Mbit/s PSK TRANSMISSION EXPERIMENT WITH HOMODYNE RECEIVER USING SNNCHRONISATION BITS," ELECTRONICS LETTERS. Vol. 27, No. 19, September 1991. However, this system has a problem that transmission speed in an electric circuit is limited.

SUMMARY OF THE INVENTION

A synchronous detection system brings a highly sensitive receiving level. When a synchronous detection system is realized in high-speed digital transmission, e.g. high-speed optical transmission, it is possible to increase transmission rate.

In a DPSK system, the configuration of a transmitter becomes complicated since the precoding with complicated procedures is indispensable while the configuration of a receiver can be simple. On the other hand, in a PSK system, the configuration of a transmitter can be simple while the receiving operation becomes difficult because it has to detect optical phase.

A data receiving method according to an exemplary embodiment of the invention is a method to receive a data in a data transmission system wherein a transmission unit is a frame including a pilot signal with a predetermined optical phase and one or more optical data signals to carry data using phase modulation and the optical pilot signal and the one or more optical data signals are disposed on its timeslots at predetermined time intervals respectively. The data receiving method includes generating a frame-timing signal to indicate timing of the frame from an optical signal input from an optical transmission line, generating an optical phase reference signal from the optical pilot signal in the signal light input from the optical transmission line, the optical phase reference signal including a plurality of optical pilot signals disposed at the temporal intervals equal to an integral multiple of the predetermined time intervals, converting the signal light input from the optical transmission line into an intensity modulated optical signal according to the optical phase reference signal, photo-electrically converting the intensity modulated signal light into an electrical signal, generating a clock synchronized with the data signal light from the signal light input from the optical transmission line, and extracting the data from the electrical signal according to the clock and the frame-timing signal.

A data receiver according to an exemplary embodiment of the invention is used in a data transmission system wherein a transmission unit is a frame including a pilot signal with a predetermined optical phase and one or more optical data signals to carry data using phase modulation and disposing the pilot signal light and the one or more optical data signals on its timeslots at predetermined time intervals respectively. The data receiver includes an optical splitter to split a signal light input from an optical transmission line into a plurality of split lights, a frame-timing signal generator to generate a frame-timing signal indicating timing of the frame from the first split light output from the optical splitter, a first Mach-Zehnder interferometer to which the second split light from the optical splitter enters, the first Mach-Zehnder interferometer having a first and second arm and having an optical gate to selectively transmit the pilot signal light and a pilot signal duplicator on the second arm, the pilot signal duplicator duplicating the output light from the optical gate in the time domain for generating an optical phase reference signal composed of a plurality of optical pilot signals being disposed at temporal interval equal to an integral multiple of the predetermined time interval, a photoelectric converter to convert the interfered output from the first Mach-Zehnder interferometer into an electrical signal, a clock regenerator to regenerate a clock synchronized with the data signal light, a data extractor to extract the data from the electrical signal, and a controller to control the data extractor and the optical gate according to the clock and the frame-timing signal.

BRIEF DESCRIPTION OF THE DRAWINGS

The above and other objects, features and advantages of the present invention will be apparent from the following detailed description of exemplary embodiments of the invention in conjunction with the accompanying drawings, in which:

FIG. 2, including FIG. 2(a), FIG. 2(b), FIG. 2(c), FIG. 2(d), FIG. 2(e), and FIG. 2(f), shows a timing chart of the first embodiment;

DETAILED DESCRIPTION

Explanatory embodiments of the invention are explained below in detail with reference to the drawings.

Figure 1:
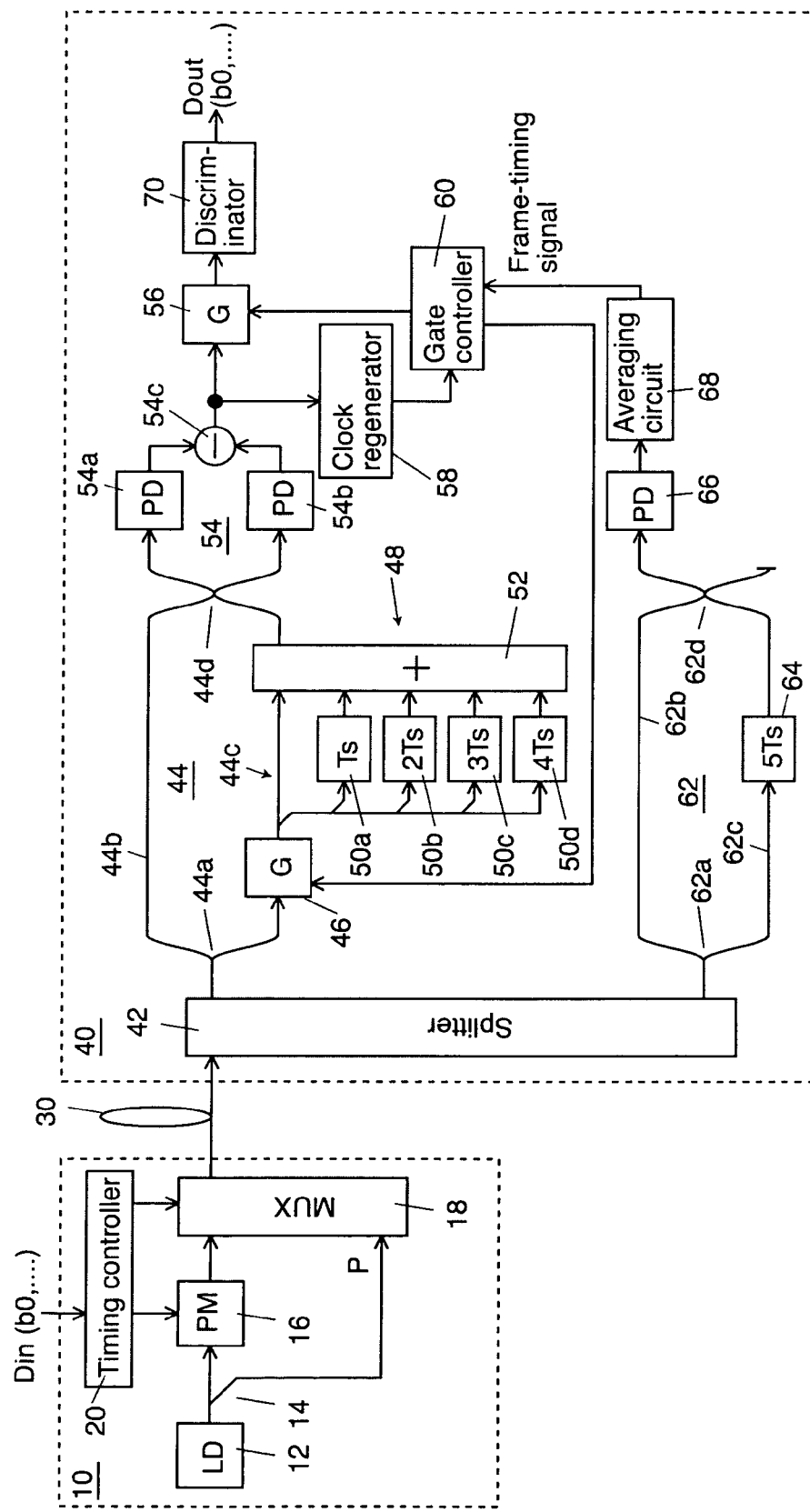
FIG. 1 shows a schematic block diagram according to a first exemplary embodiment of the invention.

FIG. 1 shows a schematic block diagram according to a first exemplary embodiment of the invention which is applied to an optical transmission system using BPSK (Binary Phase Shift Keying) modulation and FIG. 2 shows a timing chart of the embodiment. In the optical domain of this embodiment, a binary digit "0" is expressed as a relative optical phase "0", a binary digit "1" is expressed as a relative optical phase "π", and a pilot signal being inserted in or time-division-demultiplexed with a data light is expressed as a relative optical phase "0".

A laser diode 12 in an optical transmitter 10 generates a coherent continuous laser light to be a carrier. An optical splitter 14 splits the output laser light from the laser diode 12 into two portions and applies one split light to a phase modulator 16 and the other to a multiplexer 18 as a pilot signal.

A timing controller 20 adjusts timing of an input data Din so that an after-mentioned pilot signal can be inserted in it, and applies it to the phase modulator 16. The phase modulator 16 binary-modulates optical phase of the continuous laser light from the optical splitter 14 according to the data from the timing controller 20. In this embodiment, the phase modulator 16 outputs the input laser light intact when the binary digit is "0" while it outputs the input laser light after shifting its optical phase by "π" when the binary digit is "1".

The timing controller 20 also controls the multiplexer 18 so as to multiplex a pilot signal P from the optical splitter 14 every predetermined bit number of the output signal from the phase modulator 16. The multiplexer 18 multiplexes the phase-modulated data light from the phase modulator 16 and the pilot signal from the optical splitter 14 in the time domain as shown in FIG. 2(a) and outputs the multiplexed light into an optical transmission line 22. FIG. 2(a) shows a signal disposition of the multiplexed optical signal output from the multiplexer 18. Each bit of the input data Din is shown as bits b0 to b14 and so on.

In this embodiment, a single optical pilot signal is inserted every four bits of the input data Din. One frame includes five timeslots, or 5Ts, and thus the single pilot signal P and the four bits of the data light are disposed in one frame. The data bit number included in one frame in the embodiment is only an example and can be properly selected. As a matter of explanatory convenience, a pilot signal is disposed at the head of a frame.

In the optical transmitter 10, although the optical data signal and the optical pilot signal are multiplexed in the optical stage, it is applicable that the data signal and the pilot signal are multiplexed in the electrical stage to modulate a phase of the laser light according to the multiplexed signal.

The optical signal propagated in the optical transmission line 30 enters an optical receiver 40. An optical splitter 42 splits the optical signal from the optical transmission line 30 into two portions. One portion of the split optical signals is used to separate and detect the data and the other is used to separate and detect the pilot signal.

The one portion of the optical signals split by the optical splitter 42 enters an optical splitter 44a in a Mach-Zehnder interferometer 44. Besides the optical splitter 44a, the Mach-Zehnder interferometer 44 includes two arms 44b and 44c to transmit two optical signals split by the optical splitter 44a and an optical coupler/splitter 44d to couple/split the optical signals from the arms 44b and 44c.

On the arm 44c, an optical gate 46 to exclusively transmit the optical pilot signal and a pilot signal duplicator 48 to duplicate the optical pilot signal output from the optical gate 46 are disposed. The pilot signal duplicator 48 includes an optical delay 50a to delay the output light from the optical gate 46 by 1Ts, an optical delay 50b to delay the output light from the optical gate 46 by 2Ts, an optical delay 50c to delay the output light from the optical gate 46 by 3Ts, an optical delay 50d to delay the output light from the optical gate 46 by 4Ts, and an optical combiner 52 to combine the optical output from the optical gate 46 and the optical outputs from the optical delays 50a to 50d.

A gate controller 60, which is described later, controls the optical gate 46 to exclusively transmit the optical pilot signal. FIG. 2(b) shows a timing chart of an output optical signal from the optical gate 46. Since one frame includes 5Ts in this embodiment, four kinds of the optical delays 50a to 50d with the delay time of Ts to 4Ts respectively are disposed. The pilot signal duplicator 48 outputs an optical signal in which the pilot signal separated by the optical gate 46 is duplicated on the following four timeslots. That is, the pilot signal duplicator 48 generates an optical signal in which respective timeslots in one frame are filled up with copies of the temporally close pilot signal. FIG. 2(c) shows an output signal from the pilot signal duplicator 48. The output signal from the pilot signal duplicator 48 is used as a phase reference signal to provide a phase reference of a phase-modulated optical data signal, as mentioned later. This phase reference signal propagates in the same transmission line with the optical data signal and therefore it is under the same influence of the optical transmission line with the data signal light.

The optical coupler/splitter 44d combines the data signal light from the first arm 40b with/from the phase reference signal light from the pilot signal duplicator 48 and split the combined light. The data signal light and the phase reference signal light are both affected by the same phase fluctuation in the optical transmission line and therefore it is possible to reduce the influence of the phase fluctuation in the optical transmission line through interference. Owing to the interference in the coupler/splitter 44d, the phase-modulated optical signal, or optical PSK (Phase Sift Keying) signal, is converted to an amplitude-modulated signal light, or ASK (Amplitude Shift Keying) signal light. The optical coupler/splitter 44d outputs two kinds of optical signals, one is such that two input optical signals are coupled in in-phase and the other is such that two input optical signals are coupled in reversed phase.

FIG. 2(d) shows a bit train of reversed phase coupled signal light from the optical coupler/splitter 44d. The reversed phase coupled output from the optical coupler/splitter 44d is practically a result of the interference between the optical signal shown in FIG. 2(a) and the optical phase reference signal shown in FIG. 2(c) to be an intensity-modulated optical signal of each bit of b0, b1 . . . . However, when optical pilot signals in the two optical inputs from the optical coupler/splitter 44d are located in the same timing, the value of the reversed phase coupled output becomes 0 in optical intensity due to the interference.

A photo-detector 54a in a balanced optical receiver 54 converts one of the in-phase coupled output light and reversed phase coupled output light from the optical coupler/splitter 44d into an electrical signal while a photo-detector 54b converts the other one into an electrical signal. A subtracter 54c subtracts the output electrical signal from the photo-detector 54b out of the output electrical signal from the photo-detector 54a. The receiving sensibility can be improved using the above balanced receiving process. In the case that a satisfactory signal-to-noise ratio can be obtained, it is possible to dispose an optical coupler instead of the optical coupler/splitter 44d so that a single photo-detector converts the output signal light from the optical coupler into an electrical signal.

The output electrical signal from the subtracter 54c in the balanced optical receiver 54 is applied to a gate 56 and a clock regenerator 58. The clock regenerator 58 regenerates a clock out of the output electrical signal from the subtracter 54c and applies the regenerated clock to a gate control apparatus 60. In FIG. 1, the optical coupler 52 in the pilot signal duplicator 48 also couples the output light from the optical gate 46. In this configuration, when it is set that the output from the balanced optical receiver 54 always has a predetermined amplitude in a coupling result of two pilot signals, the clock regeneration by the clock regenerator 58 becomes stable.

The other split light from the optical splitter 42 enters an optical splitter 62a in another Mach-Zehnder interferometer 62. Besides the optical splitter 62a, the Mach-Zehnder interferometer 62 includes two arms 62b and 62c to transmit the two optical signals split by the optical splitter 62a respectively and an optical coupler 62d to couple the two optical signals traveled through the arms 62b and 62c.

An optical delay 64 of delay time 5Ts, which corresponds to the frame period, is disposed on the arm 62c. FIG. 2(e) shows the output optical signal from the optical delay 64. The Mach-Zehnder interferometer 62 makes the optical signal from the optical splitter 42 and an optical signal delayed by 5Ts interfere with each other. Due to the delay of 5Ts, the two input optical signals to the optical coupler 62d include adjacent pilot signals, e.g. P1 and P2, every 5Ts on the same timeslot respectively. The optical coupler 62d couples the two input optical signals in phase. The optical coupler 62d therefore outputs an optical signal of optical intensity 1 every 5Ts. The optical coupler 62d couples optical signals to carry a data bit on the timeslots in which no pilot signals are located. In this case, the optical intensity of the output signal light from the optical coupler 62d is undefined. A photo-detector 66 converts the output optical signal from the optical coupler 62d into an electrical signal. FIG. 2(f) shows amplitude (a relative value) of the output signal from the photo-detector 66. Although amplitude of a timeslot in which no value is recorded is undefined, it is smaller than 1.

An averaging circuit 68 averages the output from the photo-detector 66 by a predetermined cycle, e.g. frame cycle. With this operation, the timing of the pilot signal, more specifically the timing of the frame, can be determined and the averaging circuit 68 provides a timing signal indicating the timing of the receiving frame to the gate controller 60.

The gate controller 60 controls the optical gate 46 to transmit the optical pilot signal according to both regenerated clock from the clock regenerator 58 and frame timing signal from the averaging circuit 68 and the gate controller 60 also controls the gate 56 to exclusively transmit the timeslot parts of the data b0, b1 . . . except for the pilot signal out of the electrical signal output from the subtracter 54c.

The gate 56 transmits only the data signal part out of the output electrical signal (FIG. 2(d)) from the subtracter 54c according to the control signal from the gate controller 60. A discriminator 70 discriminates a digital value from the output electrical signal from the gate 56. It is applicable that a digital value is discriminated from the output electrical signal from the subtracter 54c and temporarily stored in a memory in advance, and thereafter the data signals b0, b1, . . . are read out of the memory.

In the embodiment shown in FIG. 1, the receiver 40 receives all the data. In such a case that it is satisfactory to exclusively receive the data in a specific bit location in one frame, one of the optical delays of 50a to 50d corresponding to the desired bit location should be disposed. For instance, when the data b1, b5, b9 . . . are desired to receive, the corresponding optical delay 50b of 2Ts, alone should be left and the other optical delays 50a, 50c, and 50d are removed. It is applicable that the required data is selected at the gate 56.

Figure 3:
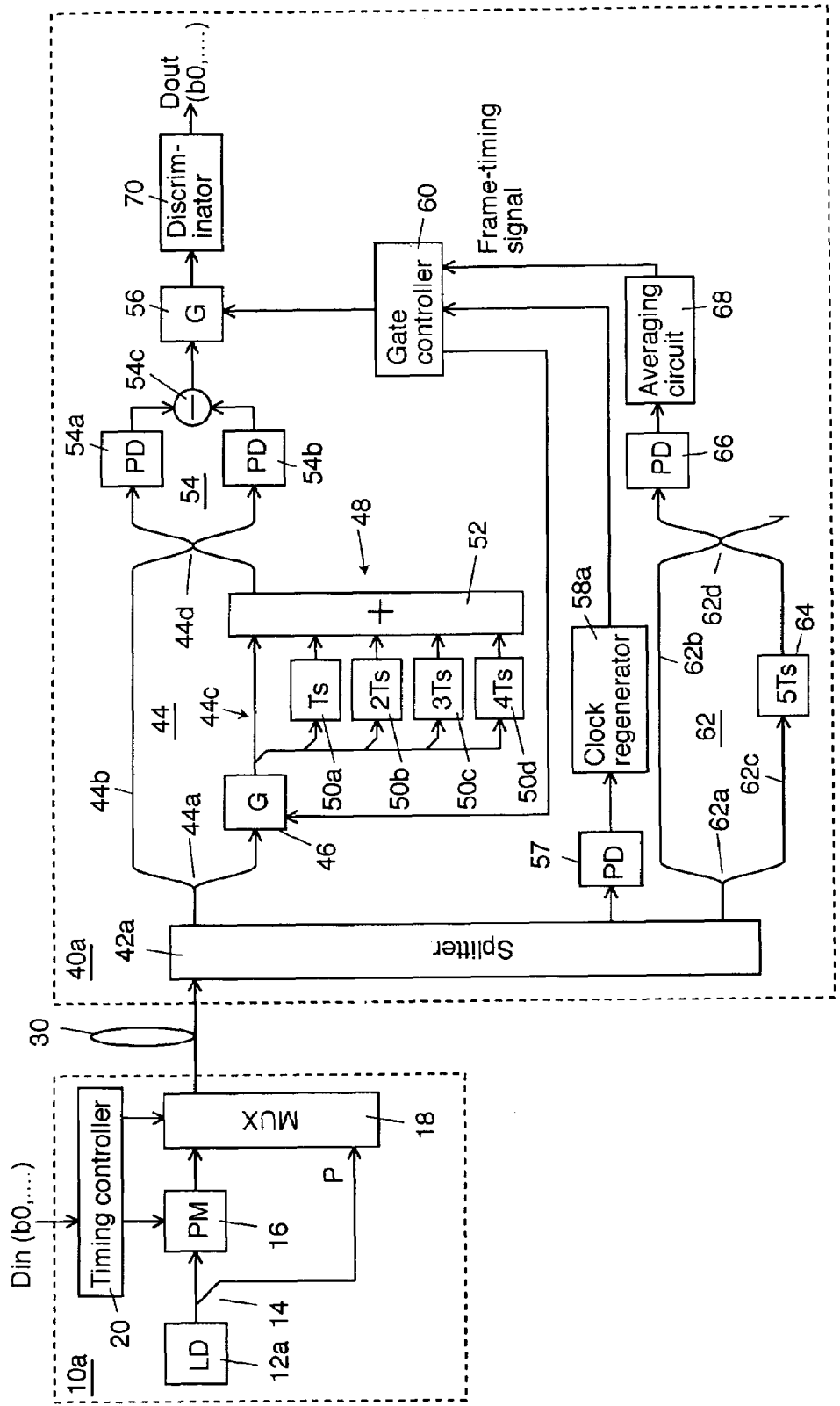
FIG. 3 shows a schematic block diagram according to a second exemplary embodiment of the invention.

In the embodiment shown in FIG. 1, although the output laser light from the laser diode 12 was a continuous light, it also can be a pulse laser light in which each timeslot has one pulse. When the pulse light is used, the clock regenerating operation in the optical receiver 40 becomes easier. FIG. 3 shows a schematic block diagram of an exemplary embodiment modified according to the above manner. The elements identical to those in FIG. 1 are labeled with common reference numerals.

A laser diode 12a in an optical transmitter 10a outputs a pulse laser light. A phase modulator 16 modulates optical phase of each pulse of a pulse laser light output from an optical splitter 14 according to a data from a timing controller 20. With this operation, the optical transmitter 10a outputs a phase modulated optical pulse signal and a pilot signal comprising optical pulse into an optical transmission line 30.

An optical splitter 42a in an optical receiver 40a splits the optical signal input from the optical transmission line 30 into three portions and provides a first split light to a Mach-Zehnder interferometer 44, a second split light to a Mach-Zehnder interferometer 62, and a third split light to a photo-detector 57. The photo-detector 57 converts the third split light into an electrical signal. The electrical signal output from the photo-detector 57 includes a frequency component of the pulse laser light output from the laser diode 12a. A clock regenerator 58a regenerates a clock from the output from the photo-detector 57 and provides the regenerated clock to a gate controller 60.

The other operations are identical to those of the embodiment shown in FIG. 1.

When an optical pulse width expander is disposed at the output stage of the gate 46 to extend the pulse width of the extracted optical pulse of the pilot signal, the data signal separating performance through interference is improved in the optical coupler/splitter 44d. As one of such optical pulse width expanders, there is a highly nonlinear fiber.

Figure 4:
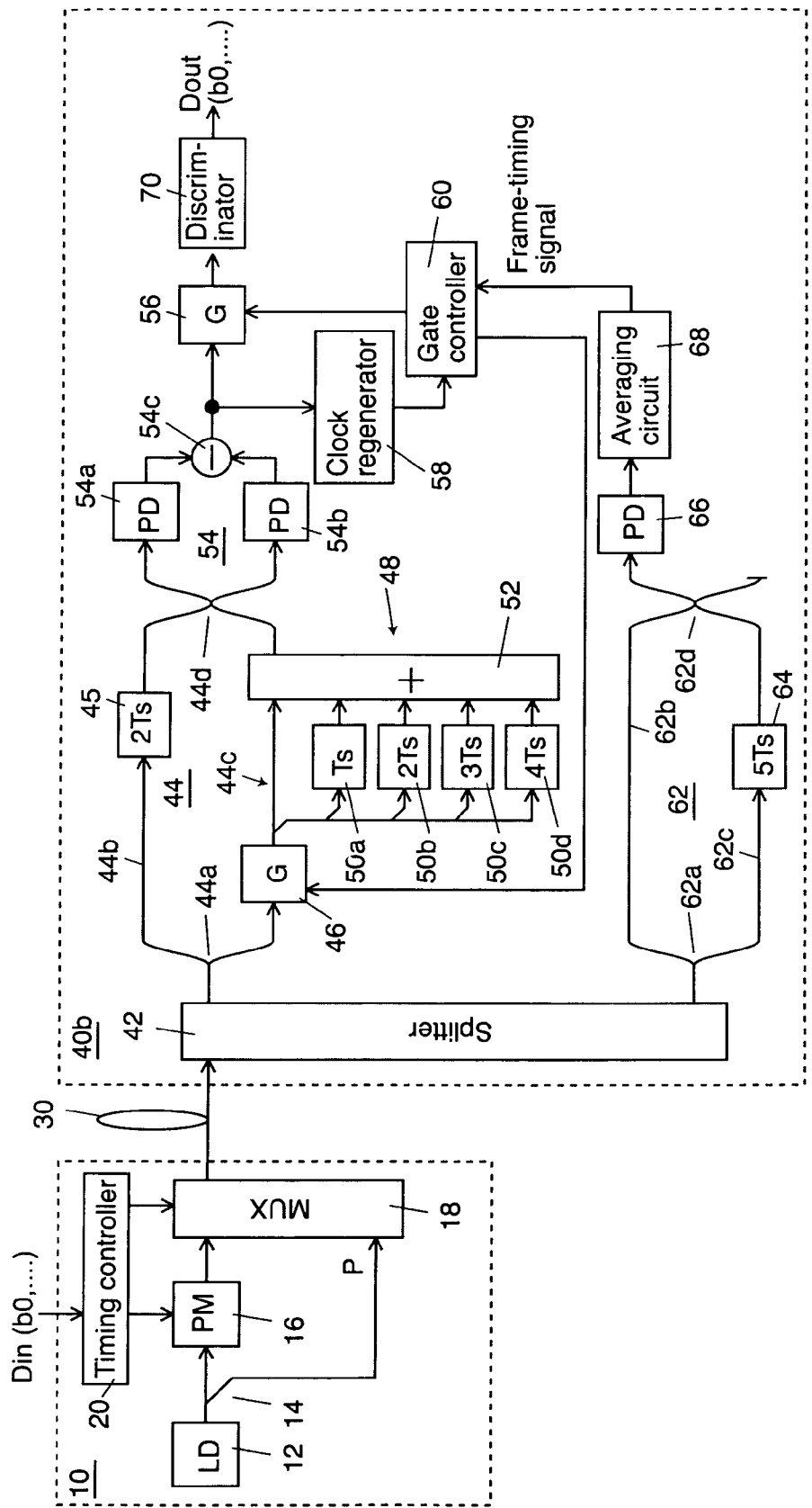
FIG. 4 shows a schematic block diagram according to a third exemplary embodiment of the invention.

It is preferable that the two input optical signals to the optical coupler/splitter 44d are temporally close to each other. Accordingly, as shown in FIG. 4, an optical delay 45 of 2Ts, is disposed on a first arm 44b of the Mach-Zehnder interferometer 44 in an optical receiver 40b. With this configuration, phase reference signals which are temporally closer can be used. FIG. 4 shows a schematic block diagram of an exemplary embodiment modified according to the above manner. The elements identical to those in FIG. 1 are labeled with common reference numerals.

In the embodiment shown in FIG. 1, although the maximum time difference between the phase reference signal light and the data signal light becomes 4Ts at the optical coupler/splitter 44d, it becomes 2Ts, in the embodiment shown in FIG. 4.

Although the time difference between the phase reference signal light and the data signal light becomes larger compared to that in the embodiment shown in FIG. 4, the delay time of the optical delay 45 can be 1Ts or 3Ts.

Although the embodiment applied to a BPSK system is explained, this invention is also applicable to a multi-level PSK system. In that case, a required number of receiving systems, each having an optical phase shifter to separate each orthogonal component on a Mach-Zehnder interferometer, should be disposed in parallel. In other words, this invention is applicable to BPSK reception, which is one of the elements of the multi-level PSK. Similarly, this invention is applicable to a modulation system, e.g. QAM, which uses phase modulation and amplitude modulation together, and can be used for BPSK reception, which is one of the elements of QAM.

When the amplitude of the pilot signal is set to larger than those of the other signals in the optical transmitter, it becomes easier to determine the frame timing at the receiver.

In each of the above embodiments, although the frame unit is set to 1 bit to make it clearly understandable, it is applicable to set the frame unit to a predetermined number of bits. That is, 1 frame includes a plurality of symbols, each symbol as a unit having one or more bits. The pilot signal is assigned as one of the symbols in one frame.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A data receiving method to receive data in a data transmission system wherein a transmission unit is a frame including an optical pilot signal of a predetermined optical phase and one or more optical data signals to carry data using phase modulation, and the optical pilot signal and the one or more optical data signals are disposed on timeslots at a predetermined time interval in each frame, the method comprising:

generating a frame-timing signal from an optical signal received from an optical transmission line to indicate timing of the frame;

generating an optical phase reference signal including a plurality of optical pilot signals temporally apart from each other by an integral multiple of the predetermined time interval, from the optical pilot signal in the signal light received from the optical transmission line;

converting the optical signal received from the optical transmission line into an intensity-modulated optical signal according to the optical phase reference signal;

photo-electrically converting the intensity-modulated optical signal into an electrical signal;

generating a clock synchronized with an optical data signal from the optical signal received from the optical transmission line; and extracting the data from the electrical signal according to the clock and the frame-timing signal.

2. The data receiving method of claim 1 wherein the step of generating a clock comprises generating a clock synchronized with the optical data signal from the electrical signal.

3. The data receiving method of claim 1 wherein the step of generating a clock comprises generating a clock synchronized with the optical data signal out of an electrical signal converted from the signal light received from the optical transmission line.

4. The data receiving method of claim 1 wherein the step of generating the frame-timing signal comprises:

separating the optical pilot signal from the optical signal received from the optical transmission line using a first Mach-Zehnder interferometer having a first and second arm and having an optical delay time corresponding to one cycle of the frame;

converting the separated optical pilot signal into an electrical pilot signal; and generating the frame-timing signal from the electrical pilot signal.

5. The data receiving method of claim 1 wherein the step of generating the optical phase reference signal comprises:

selectively separating the optical pilot signal from the optical signal received from the optical transmission line; and duplicating the separated optical pilot signal to generate the optical phase reference signal composed of a plurality of the optical pilot signals having temporal intervals equal to an integral multiple of the predetermined time interval.

6. The data receiving method of claim 1 wherein the step of converting comprises:

delaying the optical signal received from the optical transmission line by a predetermined period; and interfering the delayed optical signal and the optical phase reference signal.

7. A data receiver in a data transmission system wherein a transmission unit is a frame including an optical pilot signal of a predetermined optical phase and one or more optical data signals to carry data using phase modulation, and the optical pilot signal and the one or more optical data signals are disposed on timeslots of a predetermined time interval in each frame comprising:

an optical splitter to split an optical signal received from an optical transmission line into a plurality of split optical lights;

a frame-timing signal generator to generate a frame-timing signal indicating timing of the frame from a first split light output from the optical splitter;

a first Mach-Zehnder interferometer to which the second split light output from the optical splitter enters, the first Mach-Zehnder interferometer having a first and second arm and having an optical gate to selectively transmit an optical pilot signal and a pilot signal duplicator on the second arm, the pilot signal duplicator duplicating the output light from the optical gate in time domain to generate an optical phase reference signal composed of a plurality of optical pilot signals being disposed at temporal interval equal to an integral multiple of the predetermined time interval;

a photo-electrical converter to convert the output from the first Mach-Zehnder interferometer into an electrical signal;

a clock regenerator to regenerate a clock synchronized with the optical data signal;

a data extractor to extract the data from the electrical signal; and a controller to control the data extractor and the optical gate according to the clock and the frame-timing signal.

8. The data receiver of claim 7 wherein the clock regenerator regenerates the clock from the electrical signal.

9. The data receiver of claim 7 wherein the optical splitter outputs a third split light; and the clock regenerator regenerates the clock from the third split light.

10. The data receiver of claim 7 wherein the frame-timing signal generator comprises:

a second Mach-Zehnder interferometer having a second optical delay time corresponding to one cycle of the frame; and a second photo-electrical converter to convert the output light from the second Mach-Zehnder interferometer into an electrical signal.

11. The data receiver of claim 7 wherein the pilot signal duplicator comprises:

a plurality of optical delays, each having a different delay time and corresponding to an integral multiple of the predetermined time interval, to delay the output light from the optical gate; and an optical coupler to couple the respective outputs from the plurality of optical delays.

12. The data receiver of claim 11 wherein the optical coupler couples the output from the optical gate and the respective outputs from the plurality of optical delays.

13. The data receiver of claim 7 wherein the first Mach-Zehnder interferometer comprises an optical delay time corresponding to an integral multiple of the predetermined time interval on the first arm.

14. The data receiver of claim 7 wherein the photo-electrical converter comprises a balanced optical receiver.

15. An optical data receiver comprising:

an optical splitter to split an optical signal received from an optical transmission line into a plurality of split-optical lights;

a signal generator to generate a frame-timing signal from one of the plurality of split lights;

a first interferometer to selectively outputting an optical pilot signal at intervals equal to an integral multiple of a predetermined time interval, wherein one or more optical data signals are disposed on timeslots of the predetermined time interval in a frame;

a converter to convert the output from the interferometer into an electrical signal;

a clock regenerator to regenerate a clock synchronized with the optical data signal; and a data extractor to extract the data from the electrical signal.

16. The optical data receiver of claim 15, further comprising a controller to control the data extractor according to the clock and the frame-timing signal.

17. The data receiver of claim 15 wherein the clock regenerator regenerates the clock from the electrical signal.

18. The data receiver of claim 15 wherein the optical splitter outputs a third split light, and the clock regenerator regenerates the clock from the third split light.

19. The data receiver of claim 15 wherein the signal generator comprises:

a second interferometer having an optical delay-time corresponding to one cycle of the frame; and a second converter to convert the output light from the second interferometer into an electrical signal.

20. The data receiver of claim 15 wherein the converter comprises a balanced optical receiver.

* * * * *